US011893502B2

(12) United States Patent
Malaya et al.

(10) Patent No.: US 11,893,502 B2
(45) Date of Patent: Feb. 6, 2024

(54) DYNAMIC HARDWARE SELECTION FOR EXPERTS IN MIXTURE-OF-EXPERTS MODEL

(71) Applicant: Advanced Micro Devices, Inc., Santa Clara, CA (US)

(72) Inventors: Nicholas Malaya, Austin, TX (US); Nuwan Jayasena, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1125 days.

(21) Appl. No.: 15/849,633

(22) Filed: Dec. 20, 2017

(65) Prior Publication Data

US 2019/0188577 A1  Jun. 20, 2019

(51) Int. Cl.
*G06N 5/022* (2023.01)
*G06N 20/00* (2019.01)
*G06F 7/02* (2006.01)

(52) U.S. Cl.
CPC ............. *G06N 5/022* (2013.01); *G06N 20/00* (2019.01); *G06F 7/02* (2013.01)

(58) Field of Classification Search
CPC ........... G06N 5/022; G06N 20/00; G06F 7/02
See application file for complete search history.

(56) References Cited

U.S. PATENT DOCUMENTS

2013/0346988 A1\* 12/2013 Bruno ................... G06F 9/5066
  718/102
2018/0234491 A1\* 8/2018 Gomes De Oliveira ....................
  G06F 11/3433
2018/0324069 A1\* 11/2018 Kleinheksel ........ H04L 67/1001

OTHER PUBLICATIONS

Rattanatamrong, Prapaporn. Real-time scheduling of ensemble systems with limited resources. University of Florida, 2011 (Year: 2011).\*
Marco et al. "Improving spark application throughput via memory aware task co-location: A mixture of experts approach." Proceedings of the 18th ACM/IFIP/USENIX Middleware Conference (Year: 2017).\*

(Continued)

*Primary Examiner* — Michael J Huntley
*Assistant Examiner* — Adam C Standke
(74) *Attorney, Agent, or Firm* — Volpe Koenig (57) ABSTRACT

A system assigns experts of a mixture-of-experts artificial intelligence model to processing devices in an automated manner. The system includes an orchestrator component that maintains priority data that stores, for each of a set of experts, and for each of a set of execution parameters, ranking information that ranks different processing devices for the particular execution parameter. In one example, for the execution parameter of execution speed, and for a first expert, the priority data indicates that a central processing unit ("CPU") executes the first expert faster than a graphics processing unit ("GPU"). In this example, for the execution parameter of power consumption, and for the first expert, the priority data indicates that a GPU uses less power than a CPU. The priority data stores such information for one or more processing devices, one or more experts, and one or more execution characteristics.

15 Claims, 6 Drawing Sheets

(56) References Cited

OTHER PUBLICATIONS

Rattanatamrong et al. "Real-time scheduling of mixture-of-experts systems with limited resources." Proceedings of the 13th ACM international conference on Hybrid systems: computation and control. (Year: 2010).*
Rattanatamrong et al., "Dynamic scheduling of real-time mixture-of-experts systems on limited resources." IEEE Transactions on Computers 63.7 (Year: 2013).*
Alareqi et al., Functional Heterogeneous Processor Affinity Characterization to Big Data: Towards Machine Learning Approach. In 2017 International Conference on Computational Science and Computational Intelligence (CSCI) Dec. 1, 20174 (pp. 1432-1436). IEEE (Year: 2017).*
Hadjis, Stefan, et al. "Omnivore: An optimizer for multi-device deep learning on cpus and gpus." arXiv preprint arXiv:1606.04487 (Year: 2016).*
Rattanatamrong, Prapaporn. Real-time scheduling of ensemble systems with limited resources. University of Florida (Year: 2011).*
Jouppi, N. et al., "In-Datacenter Performance Analysis of a Tensor Processing Unit", Proceedings of the 44th Annual International Symposium on Computer Architecture, Toronto, ON, CA, Jun. 24-28, 2017, pp. 1-12, ACM, New York, NY, USA.
Shazeer, N. et al., "Outrageously Large Neural Networks: The Sparsely-Gated Mixture-of-Experts Layer", arXiv:1701.06538v1, (Jan. 23, 2017).

* cited by examiner

DYNAMIC HARDWARE SELECTION FOR EXPERTS IN MIXTURE-OF-EXPERTS MODEL

BACKGROUND

A modern approach to machine learning is known as the mixture of experts technique. According to this approach, a gating network partitions an input space into different domains and selects particular "experts" for processing the different domains. The gating network is evaluated to select one or more experts and produce prediction output. As the experts process different portions of input, the experts may each have independent training data. The "divide-and-conquer" approach associated with the mixture of experts model produces increased accuracy as compared with some other types of models. Improvements to this model are constantly being made.

BRIEF DESCRIPTION OF THE DRAWINGS

A more detailed understanding can be had from the following description, given by way of example in conjunction with the accompanying drawings wherein.

DETAILED DESCRIPTION

A modern approach to machine learning is known as the mixture of experts technique. According to this technique, a gating network partitions an input space into different domains and selects particular "experts" for processing the different domains. The gating network obtains the results of the expert processing and combines the results to produce prediction output. Because the experts process different portions of input, the experts may each have independent training data. The "divide-and-conquer" approach associated with the mixture of experts model produces increased accuracy as compared with some other types of models.

Different experts are embodied as partially or wholly independent processing tasks. Thus, it is possible to execute different experts on completely different hardware. Some computer systems include multiple independent, homogeneous processing devices such that, although different experts are executable in different processing devices, no noticeable difference in execution parameters would be observed. However, other computer systems include heterogeneous processing devices with different processing characteristics. Some examples of different processing devices include microprocessors (such as central processing units ("CPUs")) that generally execute in a single-instruction-single-data fashion, data-parallel processing devices (such as graphics processing units ("GPUs")) that include large numbers of parallel processing units for processing multiple instructions or tasks in parallel and execute in a single-instruction-multiple-data ("SIMD") fashion, other forms of parallel processing devices (such as data-flow execution engines), programmable logic devices (such as field-programmable gate arrays ("FPGAs")) that can be customized to the operations to be executed, application-specific integrated circuits, or other processing devices that are capable of executing the experts.

For a variety of reasons, it is often beneficial to run mixture-of-experts type machine learning models in computer systems having heterogeneous processing devices. For example, some experts may benefit from a certain type of hardware (such as SIMD) while others benefit from other types of hardware (such as non-SIMD). In another example, already-existing computer systems include a heterogeneous combination of processing devices, and the mixture-of-experts type machine learning model is executed on such a computer system due to the availability of that system.

Experts sometimes differ in terms of execution characteristics. Thus, different experts often differ in terms of which processing device, of a computer system having heterogeneous processing devices, is advantageous to use for executing the experts. In an example, a first expert executes more quickly on a CPU and a second expert executes more quickly on a GPU. Speed of execution is just one example of an execution parameter deemed "advantageous" to optimize, and other execution parameters are possible, such as power consumption or other execution parameters.

For this reason, a system is proposed herein that assigns experts to processing devices in an automated manner. The system includes an orchestrator component that maintains priority data that stores, for each of a set of experts, and for each of a set of execution parameters, ranking information that ranks different processing devices for the particular execution parameter. In one example, for the execution parameter of execution speed, and for a first expert, the priority data indicates that a CPU executes the first expert faster than a GPU. In this example, for the execution parameter of power consumption, and for the first expert, the priority data indicates that a GPU uses less power than a CPU. The priority data stores such information for one or more processing devices, one or more experts, and one or more execution characteristics.

In some examples, the orchestrator component obtains this priority data by executing different experts on different processing devices and obtaining measurements for each of the execution parameters for which data is desired. For example, the orchestrator component executes a first expert on each processing device of a set of processing devices and measures different execution parameters for each of the processing devices of the set of processing devices. The orchestrator component stores the measurements into a priority data storage. Subsequently, the orchestrator uses this data to select a particular processing device for executing experts. In some examples, the entity that obtains these priority data measurements is not the same entity as the entity that actually schedules the experts for execution. The above techniques allow for automated selection of hardware devices for execution of experts for a mixture of experts machine learning model.

In some examples, in addition to simply executing different experts on different hardware devices, the orchestrator component varies one or more model characteristics or parameters. The model characteristics or parameters may change how a particular expert performs on a particular hardware device and may change the relative priority among a plurality of processing devices for a particular invocation of an expert. Some examples of model characteristics or parameters include batch size, number of processors over which the expert is parallelized, and model hyper-parameters, such as the number of hidden layers in a neural network or the number of training iterations. The purpose of varying model parameters is to identify desired model parameters for execution of the expert on a particular hardware device. For example, for the execution parameter of execution speed, an invocation of a particular expert for inference on a small input batch may complete faster on a CPU while an invocation of the same expert for inference on a large batch of inputs may complete faster on a GPU. Desired model parameters may differ for different execution parameters.

Figure 1A:
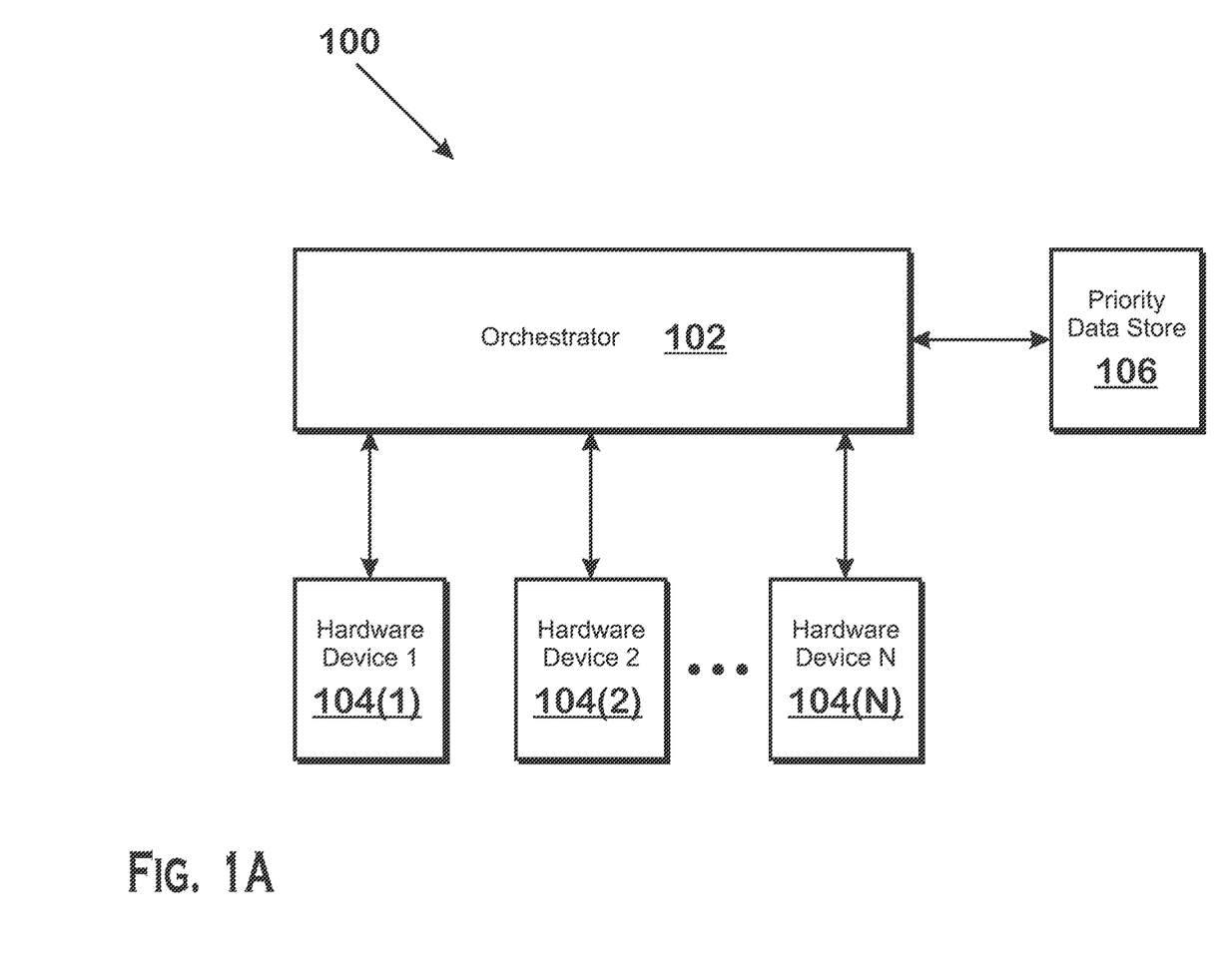
FIG. 1A is a block diagram of a computer system for executing mixture-of-experts artificial intelligence models, according to an example.

FIG. 1A is a block diagram of a computer system 100 for executing mixture-of-experts artificial intelligence models, according to an example. As shown, the computer system 100 includes an orchestrator 102, a priority data store 106, and one or more hardware devices 104 (also referred to as "processing devices").

Each of the hardware devices 104 includes one or more processing elements that are able to execute experts of a mixture-of-experts model. Any technically feasible type or combination of types of processing elements may be included in any of the hardware devices 104. In an example, one hardware device 104 is a graphics processing unit ("GPU") including a plurality of processing units that execute according to a single-instruction-multiple-data ("SIMD") paradigm, another hardware device 104 is a central processing unit ("CPU") including one or more cores, another hardware device 104 is an application specific integrated circuit ("ASIC"), and so on.

The orchestrator 102 is an entity capable of managing execution of the experts of the mixture-of-experts model. In various examples, the orchestrator 102 is embodied as software executing on hardware, as firmware executing on hardware, as hard-wired circuitry, as any combination of software, firmware, or hard-wired circuitry, or may be embodied in any other technically feasible manner. In some implementations, the orchestrator 102 is separate from the hardware devices 104. In other implementations, the orchestrator 102 is resident within one or more of the hardware devices 104. In some implementations, the orchestrator 102 is a single entity, such as a single program or single piece of hardware, while in other implementations, the orchestrator 102 is a distributed entity, having multiple software and/or hardware components distributed across one or more devices that cooperate to perform the functionality described herein.

The priority data store 106 stores priority data for experts and hardware devices 104. The priority data includes, for each of a set of experts, and for each of a set of execution parameters, priority ranking information ranking hardware devices 104 for particular experts and for particular execution parameters. Execution parameters are parameters, or aspects of execution, such as execution speed, throughput, latency, power consumption, or other aspects, for which ranking occurs. In an example, the priority data indicates that for a first expert, and for the execution parameter of execution throughput, hardware device 1 104(1) has the highest priority, followed by hardware device 2 104(2), and followed by hardware device N 104(N). In another example, the priority data indicates that for a second expert, and for the execution parameter of execution latency, hardware device 2 104(2) has the highest priority, followed by hardware device 1 104(1), and followed by hardware device N 104(N). The priority data store 106 is capable of storing such data for multiple combinations of experts and execution parameters. In an example, the priority data store 106 stores data for multiple execution parameters for a first expert, multiple execution parameters for a second expert, and so on, so that when the orchestrator 102 determines that experts are to be executed, the orchestrator 102 is capable of selecting particular hardware devices 104 for executing such experts.

The priority data store 106 also stores model characteristics or parameters for different combinations of hardware devices and execution parameters. The stored model parameters indicate for which model characteristic or parameter values the expert should be executed on the associated hardware device and when optimized for the associated execution parameter. Model parameters include, without limitation, batch size, one or more processor types of the hardware device for executing the expert, number of processors to parallelize execution of the expert, and model hyper-parameters such as the number of hidden layers in a neural network or the number of training iterations. In one example, the priority data indicates that for an execution parameter of execution throughput and for a first input batch size, a first hardware device should be used to execute that expert. In another example, the priority data indicates that for an execution parameter of execution latency and for a second input batch size, a second hardware device should be used to execute that expert.

The batch size model parameter indicates the number of concurrent training examples being processed in parallel or the number of inputs to be processed during the invocation of the expert for prediction or inference. The number of hidden layers in a neural network indicates the number of sets of neurons that perform computations after the input layer and before the output (model prediction). The number of training iterations indicates the set of iterative steps used by the numerical solver, such as stochastic gradient descent.

Figure 1B:
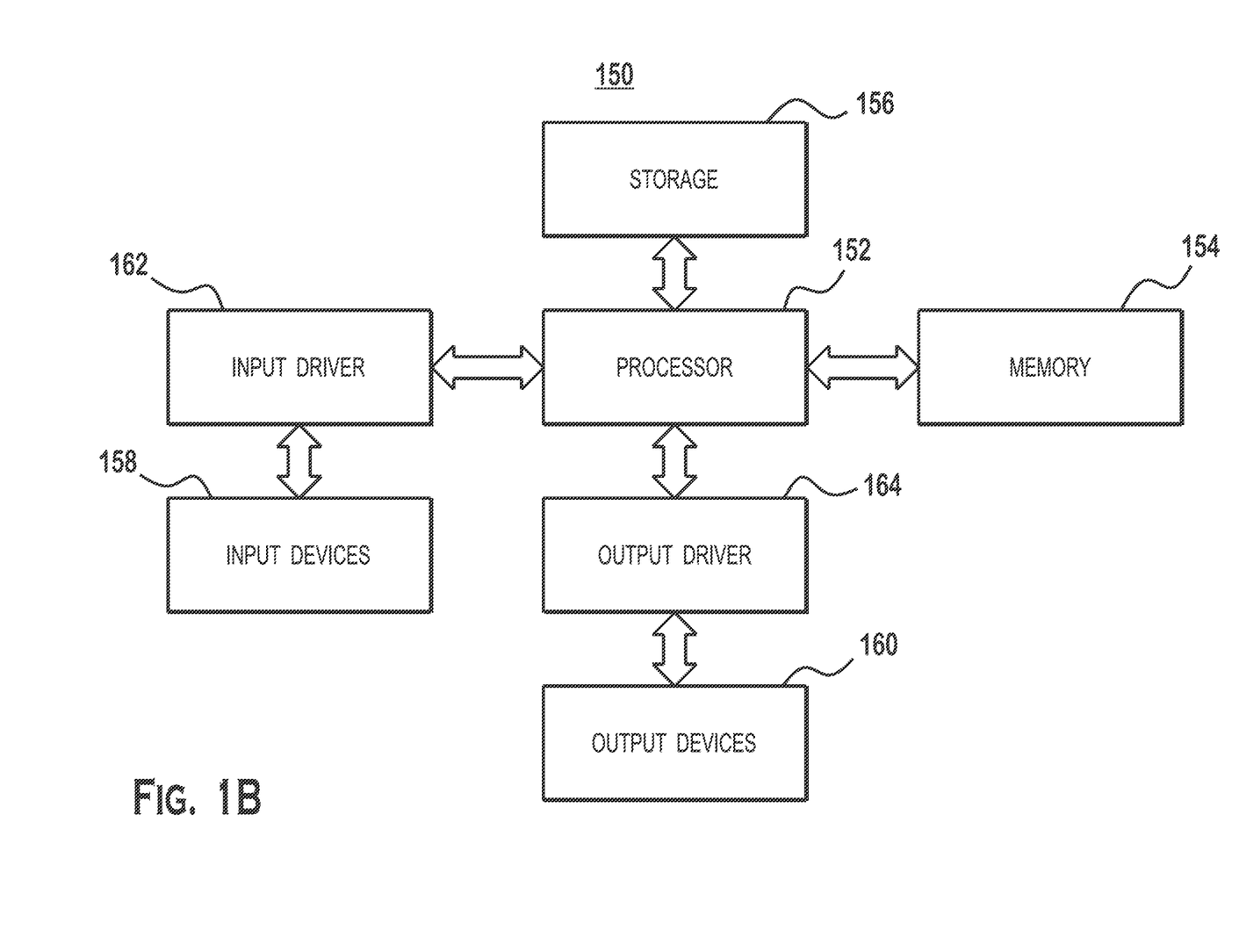
FIG. 1B is a block diagram of a computer device that is capable of implementing one or more features of the disclosure, according to an example.

FIG. 1B is a block diagram of a computer device 150 that is capable of implementing one or more features of the disclosure, according to an example. The computer device 150 is an example of one or more of the computer system 100 itself, the priority data store 106, the orchestrator 102, and/or the hardware device 104. In one example, the device 150 is embodied as, or is at least a portion of, a computer (e.g., desktop or laptop), a gaming device, a handheld device, a set-top box, a television, a mobile phone, or a tablet computer. In such examples, in some implementations, the hardware devices 104 are various processing units within the device 150, such as a CPU, GPU, ASIC, or other type of processing unit. In another example, the computer system 100 is a distributed network of computer devices 150. In such an example, each hardware device 104 is a version of the computer device 150, although it is possible for each hardware device 104 to have different computing characteristics, such as including different types of processors or the like. In such examples, it is possible for one or both of the orchestrator 102 or the priority data store 106 to also be embodied as a version of the computer device 150. In any version of the computer system 100 of FIG. 1A, it is possible for any of the orchestrator 102, priority data store 106, or hardware devices 104 to be devices different than the computer device 150. In an example, only the computer system 100 is a version of the computer device 150, and each of the hardware devices 104 are sub-components of the computer device 150, such as different types of processing devices or the like.

The device 150 includes a processor 152, a memory 154, a storage 156, one or more input devices 158, and one or more output devices 160. The device 150 also optionally includes an input driver 162 and an output driver 164. It is possible for the device 150 to include additional components not shown in FIG. 1.

In various alternatives, the processor 152 includes a central processing unit (CPU), a graphics processing unit (GPU), a CPU and GPU located on the same die, or one or more processor cores, wherein each processor core can be a CPU, a GPU, a digital signal processor (DSP) or other form of processor. In various alternatives, the memory 154 is located on the same die as the processor 152, or is located separately from the processor 152. The memory 154 includes a volatile or non-volatile memory, for example, random access memory (RAM), dynamic RAM, or a cache.

The storage 156 includes a fixed or removable storage, for example, a hard disk drive, a solid state drive, an optical disk, or a flash drive. The input devices 158 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 160 include, without limitation, a display, a speaker, a printer, a haptic feedback device, one or more lights, an antenna, or a network connection (e.g., a wireless local area network card for transmission and/or reception of wireless IEEE 802 signals).

The input driver 162 communicates with the processor 152 and the input devices 158, and permits the processor 152 to receive input from the input devices 158. The output driver 164 communicates with the processor 152 and the output devices 160, and permits the processor 152 to send output to the output devices 160. It is noted that the input driver 162 and the output driver 164 are optional components, and that the device 150 will operate in the same manner if the input driver 162 and the output driver 164 are not present.

Figure 2:
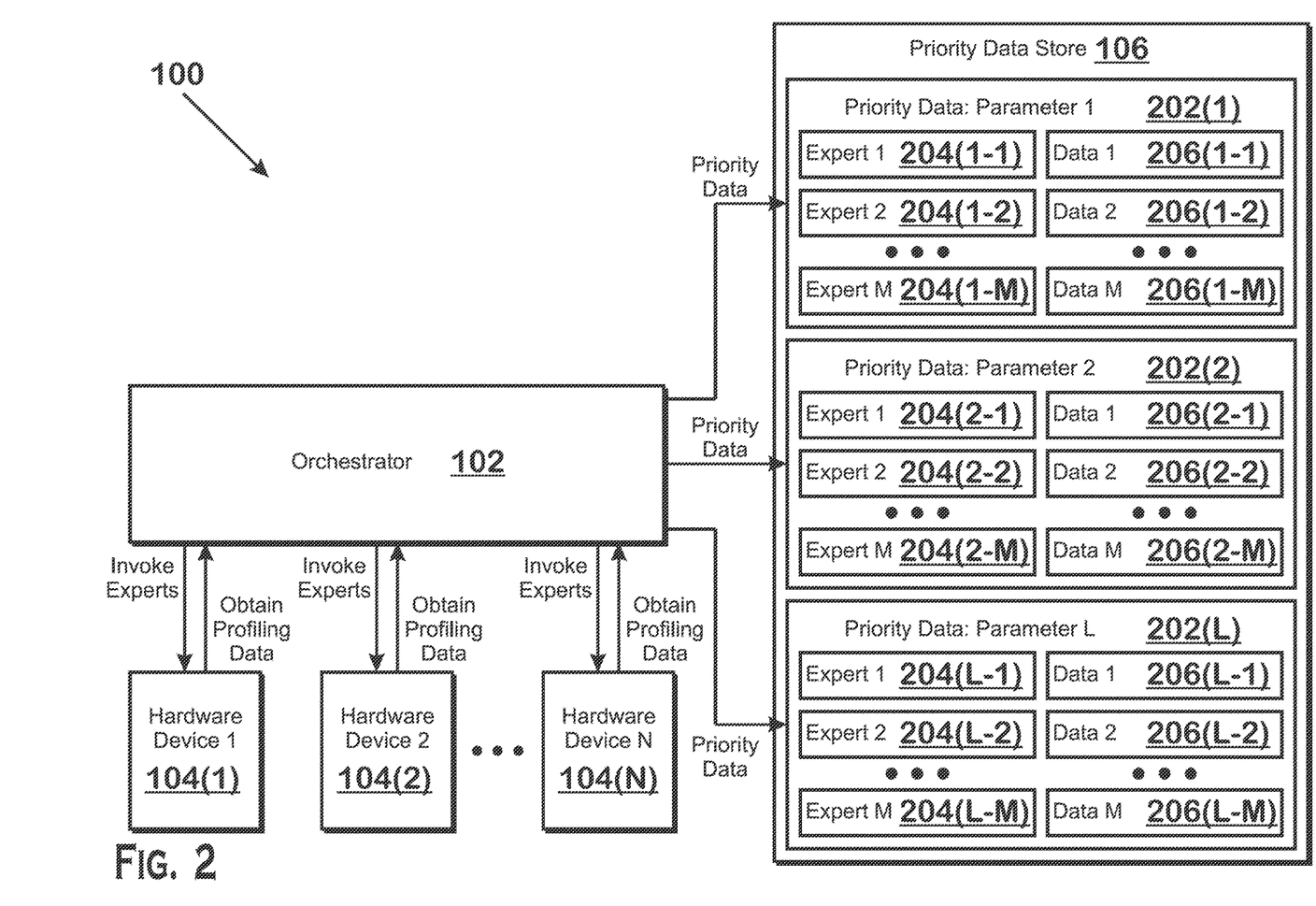
FIG. 2 illustrates operations of the computer system 100 of FIG. 1A for obtaining measurements to be stored in the priority data store 106, according to an example.

FIG. 2 illustrates operations of the computer system 100 of FIG. 1A for obtaining measurements to be stored in the priority data store 106, according to an example. The obtained measurements are used to determine which hardware device 104 to execute particular experts of a mixture-of-experts machine learning model.

To obtain this data, the orchestrator 102 executes experts on one or more of the hardware devices 104. For each expert that executes, the orchestrator 102 receives one or more items of parameter data associated with one or more different execution parameters. As described elsewhere herein, the one or more execution parameters represent different characteristics of execution of the experts on the one or more hardware devices 104. Various examples of execution parameters include execution speed (total time for execution), execution latency (time between beginning execution and receiving the results of the expert), execution throughput (rate of processing inputs), power or energy consumption, and training set accuracy. In other words, the orchestrator 102 executes the experts to obtain results for one or more execution parameters.

Upon obtaining particular results, the orchestrator 102 stores the results in the priority data store 106. As illustrated, the priority data store 106 includes priority data 202 for each of a set of execution parameters. The priority data is illustrated as being organized by execution parameter, but any technically feasible manner for storing the priority data in the priority data store 106 is possible.

The priority data illustrated in the priority data store 106 includes priority data for execution parameter 1 through execution parameter L. The priority data 202 for any particular execution parameter associates expert indications 204 that indicate particular experts with priority data 206 for those experts. For any particular expert, the associated priority data 206 ranks hardware devices 104 for the execution parameter associated with that priority data 206. For example, for a first expert and for the execution parameter of execution throughput, the associated priority data 206 indicates that hardware device 2 104(2) has better throughput than hardware device N 104(N), which has better throughput than hardware device 1 104(1). Thus, this priority data 206 ranks hardware devices 104 for each combination of expert and execution parameter. This priority data 206 is the data that the orchestrator 102 stores in the priority data store 106 upon executing the experts and obtaining the measurements for the execution parameters.

Arrows and text in FIG. 2 illustrate data and execution flow according to the technique for obtaining priority data. Specifically, the orchestrator 102 is shown as invoking experts on the different hardware devices 104. The orchestrator 102 is also shown as obtaining profiling data—measurements for execution parameters—based on the execution of the experts. The orchestrator 102 is also shown storing priority data in the priority data store 106. The orchestrator 102 runs each expert once or multiple times to obtain a statistically significant amount of data. In some implementations, the orchestrator 102 obtains the priority data after an expert is trained and/or retrained. More specifically, in some instances, the expert is continuously or periodically updated and the orchestrator 102 re-executes the experts on the various hardware devices 104 to obtain execution parameter measurements for storage as priority data.

Figure 3:
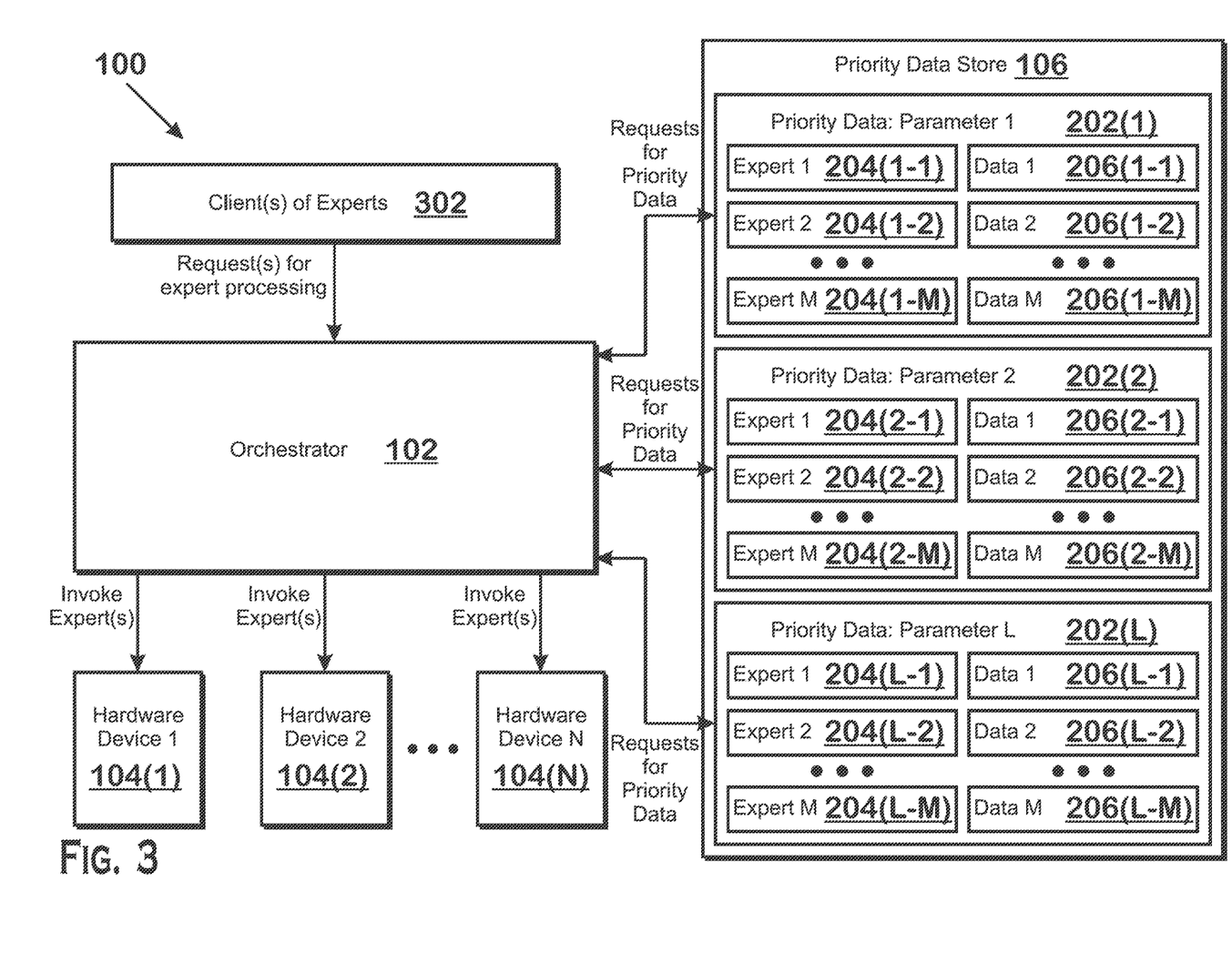
FIG. 3 illustrates operations of the computer system of FIG. 1A for utilizing priority data of the priority data store to select hardware devices on which to execute experts, according to an example.

FIG. 3 illustrates operations of the computer system 100 of FIG. 1A for utilizing priority data of the priority data store 106 to select hardware devices 104 on which to execute experts, according to an example. More specifically, clients of the experts 302 request execution of a mixture-of-experts machine learning model. This request results in the orchestrator 102 initiating execution of experts of the model. The orchestrator 102 consults the priority data store 106 to determine which hardware device 104 to execute particular experts in.

It is possible for the clients 302 to specify an execution parameter by which to prioritize the experts. For example, the clients 302 may specify that particular experts are to be executed prioritizing for the execution parameter of execution throughput. In response, the orchestrator 102 selects hardware devices 104 for execution of the requested experts based on the priority data in the priority data store 106. Selecting hardware devices 104 for execution of an expert based on the priority includes obtaining the priority data 206 associated with the expert 204 and the execution parameter 202, and identifying the highest ranked hardware device 104 for that combination of expert and execution parameter that has available processing capacity. It is possible, for example, for the highest ranked hardware device 104 for a particular combination of expert and execution parameter, to be unavailable due to being occupied by other work (such as executing other experts or performing other unrelated work). In such a situation, the orchestrator 102 selects the highest ranked hardware device 104 that has available capacity for processing the expert. Thus the priority data 206 associated with a particular combination of expert and execution parameter is used to select a hardware device 104 for processing the expert based on the ranking for that execution parameter and based on the availability of the hardware devices 104. In addition, in some implementations, selecting the hardware device 104 incorporates particular model characteristic or parameters values specified by the client for the particular invocation of the expert.

Figure 4:
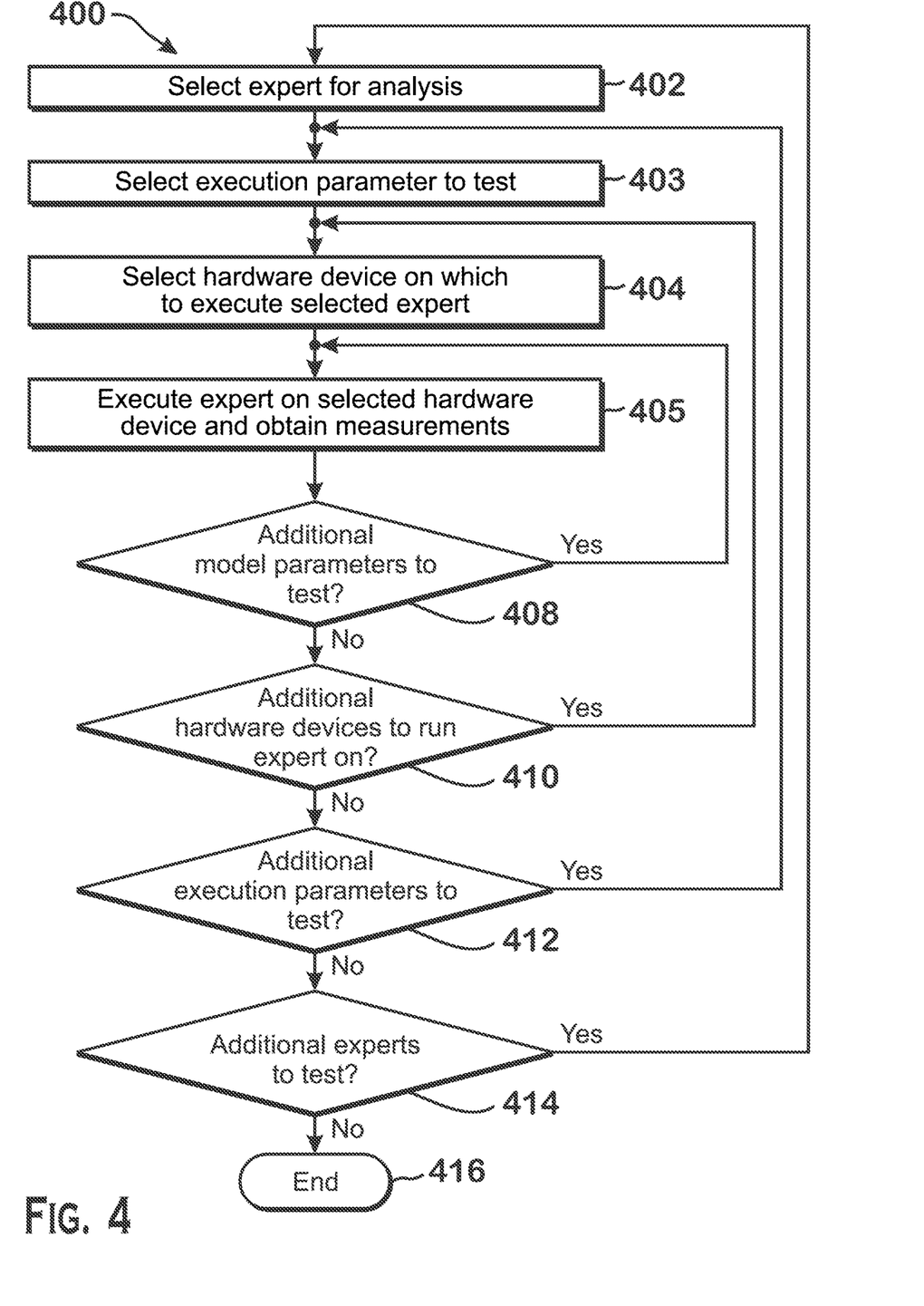
FIG. 4 is a flow diagram of a method for obtaining priority data for a set of experts of a mixture-of-experts execution model, according to an example.

FIG. 4 is a flow diagram of a method 400 for obtaining priority data for a set of experts of a mixture-of-experts execution model, according to an example. Although described with respect to the system of FIGS. 1A-3, it should be understood that any system configured to perform the steps of the method 400, in any technically feasible order, falls within the scope of the present disclosure.

The method 400 begins at step 402, where the orchestrator 102 selects an expert for analysis. As described elsewhere herein, any number of a plurality of experts of a mixture-of-experts model of execution may test for priority data. At step 403, the orchestrator 102 selects an execution parameter to test. As described elsewhere herein, examples of execution parameters include execution speed, throughput, latency, power consumption. At step 404, the orchestrator 102 selects a hardware device 104 on which to execute the selected expert. Additionally, the orchestrator 102 selects a specific set of model characteristics or parameters with which to run the expert. At step 405, the orchestrator 102 dispatches the expert to the selected hardware device with the selected model parameters.

At step 408, the orchestrator 102 determines whether there are additional model characteristics or parameters to test for the expert on the selected hardware device. As described elsewhere herein, any of the model parameters, such as batch size, number of processors over which the expert is parallelized, and model hyper-parameters, such as the number of hidden layers in a neural network or the number of training iterations. The orchestrator 102 varies the model parameters in any technically feasible and appropriate manner. If additional model parameters are to be tested, then the method returns to step 405 for execution of the expert with the differing model parameters. If no additional model parameters are to be tested (i.e., the orchestrator 102 has tested all model parameters for which priority data is desired), then the method proceeds to step 410.

At step 410, the orchestrator 102 determines whether there are additional hardware devices 104 on which to execute the expert being tested. As described elsewhere herein, the orchestrator 102 obtains priority data for an expert on multiple hardware devices 104. Thus, once priority data is obtained for one hardware device 104, the orchestrator 102 executes the expert on one or more other hardware devices 104 to obtain the priority data for those hardware devices 104. Therefore, if there are additional hardware devices 104 to run the expert on, the method 400 returns to step 404 and if there are no more additional hardware devices 104 to run the expert on, the method 400 proceeds to step 412.

At step 412, the orchestrator 102 determines whether there are additional execution parameters to test for the expert. As described elsewhere herein, the priority data includes hardware device priority for different execution parameters. If there are additional execution parameters to test, then the method 400 returns to step 403 and if there are no additional execution parameters to test, then the method 400 proceeds to step 414.

At step 414, the orchestrator 102 determines whether there are additional experts to test for generating priority data. If there are additional experts to test, then the method 400 returns to step 402. If there are no additional experts to test, then the method 400 proceeds to step 416, where the method 400 ends.

Figure 5:
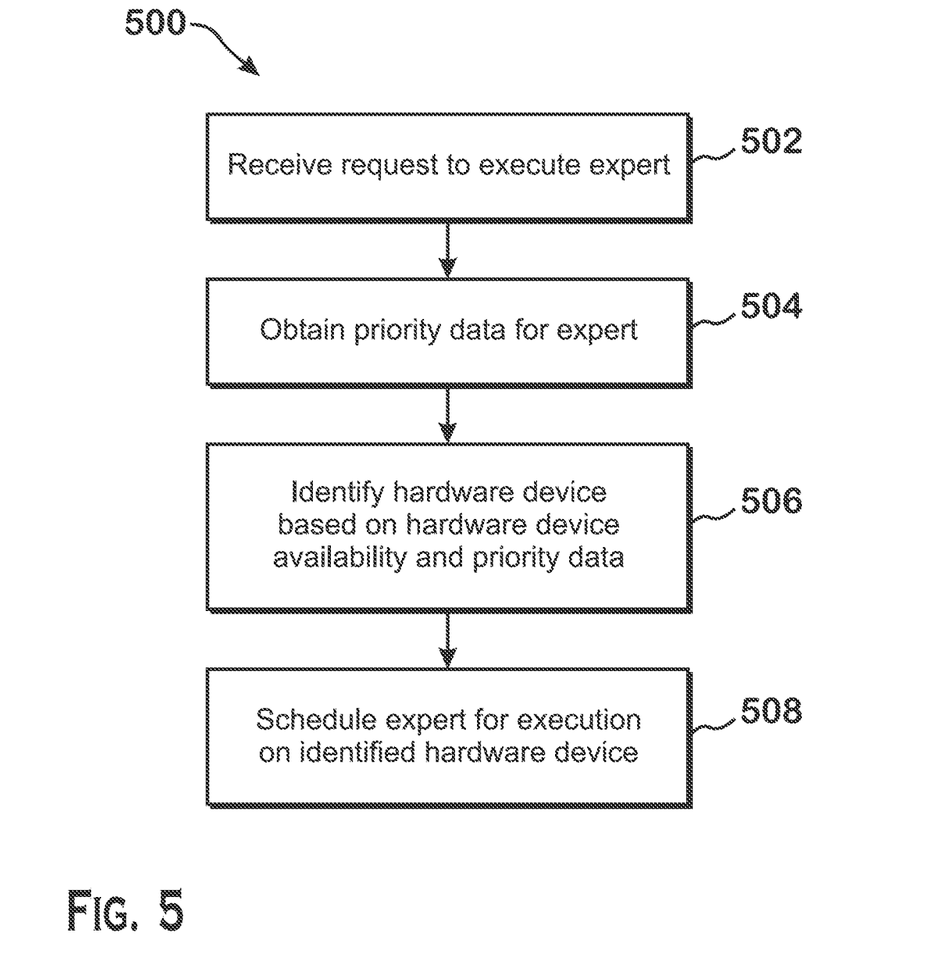
FIG. 5 is a flow diagram of a method for utilizing priority data to determine how to execute experts of a mixture-of-experts execution model, according to an example.

FIG. 5 is a flow diagram of a method 500 for utilizing priority data to determine how to execute experts of a mixture-of-experts execution model, according to an example. Although described with respect to the system of FIGS. 1A-3, it should be understood that any system configured to perform the steps of the method 500, in any technically feasible order, falls within the scope of the present disclosure.

The method 500 begins at step 502, where the orchestrator 102 receives a request to execute an expert. In various examples, this request comes from a client 302 such as a software application, a hardware device, or another entity. The request specifies a particular execution parameter to test. Some examples of execution parameters include execution speed, throughput, latency, and power consumption. At step 504, the orchestrator 102 obtains priority data from the priority data store 106 to execute the expert. The priority data includes data ranking hardware devices 104 for the expert to be executed, and for the specified execution parameter.

At step 506, the orchestrator identifies a hardware device 104 based on the priority data and the availability of the hardware devices 104. More specifically, as described elsewhere herein, the priority data ranks hardware devices 104 for particular execution parameters. Thus, for the execution parameter specified by the request at step 502, the priority data ranks the hardware devices 104 in terms of "desirability." The orchestrator 102 determines that the expert is to be executed on the highest ranked available hardware device 104 for the execution parameter. At step 508, the orchestrator 102 schedules the expert for execution on the identified hardware device 104.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for distributing an expert of a mixture-of-experts system for execution in a set of hardware devices, the method comprising:

executing experts of the mixture-of-experts system on the set of hardware devices using one or more items of parameter data associated with a plurality of execution parameters to obtain a set of priority data for different combinations of the execution parameters and the experts, the set of priority data ranking hardware devices of the set of hardware devices for executing each expert of the mixture-of-experts system for each execution parameter of the plurality of execution parameters, wherein the plurality of execution parameters includes execution speed, throughput, latency, and power consumption;

identifying one execution parameter of the plurality of execution parameters to act as a basis for selecting a hardware device, of the set of hardware devices, on which to execute the expert, the expert being a component of a mixture-of-experts machine learning model;

retrieving, from the set of priority data, priority data for a combination of the expert and the one execution parameter;

identifying a hardware device of the set of hardware devices based on the priority data, the identifying including identifying a highest ranked hardware device, for the combination of the expert and the one execution parameter, that is available for processing the expert; and dispatching the expert to the identified hardware device for execution.

2. The method of claim 1, wherein executing the experts includes testing the plurality of execution parameters for the experts to obtain the set of priority data for the different combinations of the execution parameters and the experts.

3. The method of claim 2, wherein the testing comprises:
recording measurements from the executions of the experts for the plurality of execution parameters in a data store.

4. The method of claim 3, wherein the set of priority data is generated by comparing the recorded measurements.

5. The method of claim 1, wherein the set of hardware devices comprises one or more of a central processing unit, a graphics processing unit, a field programmable gate array, a dataflow execution unit, an application specific integrated circuit, and a microprocessor.

6. A system for distributing an expert of a mixture-of-experts system for execution in a set of hardware devices, the system comprising:

a data store configured to store a set of priority data; and
an orchestrator configured to:
execute experts of the mixture-of-experts system on the set of hardware devices using one or more items of parameter data associated with a plurality of execution parameters to obtain the set of priority data for different combinations of the execution parameters and the experts, the set of priority data ranking hardware devices of the set of hardware devices for executing each expert of the mixture-of-experts system for each execution parameter of the plurality of execution parameters, wherein the plurality of execution parameters includes of execution speed, throughput, latency, and power consumption;

identify one execution parameter of the plurality of execution parameters to act as a basis for selecting a hardware device, of the set of hardware devices, on which to execute the expert, the expert being a component of a mixture-of-experts machine learning model;

retrieve, from the set of priority data stored in the data store, priority data for a combination of the expert and the one execution parameter;

identify a hardware device of the set of hardware devices based on the priority data, the identifying including identifying a highest ranked hardware device, for the combination of the expert and the one execution parameter, that is available for processing the expert; and dispatch the expert to the identified hardware device for execution.

7. The system of claim 6, wherein executing the experts includes testing the plurality of execution parameters for the experts to obtain the set of priority data for the different combinations of the execution parameters and the experts.

8. The system of claim 7, wherein the testing comprises:
recording measurements from the executions of the experts for the plurality of parameters in the data store.

9. The system of claim 8, wherein the set of priority data is generated by:
comparing the recorded measurements.

10. The system of claim 6, wherein the set of hardware devices comprises one or more of a central processing unit, a graphics processing unit, a field programmable gate array, a dataflow execution unit, an application specific integrated circuit, and a microprocessor.

11. A system, comprising:
a set of hardware devices; and
a system for distributing an expert of a mixture-of-experts system for execution in the set of hardware devices, the system comprising:
a data store configured to store a set of priority data; and
an orchestrator configured to:
execute experts of the mixture-of-experts system on the set of hardware devices using one or more items of parameter data associated with a plurality of execution parameters to obtain the priority data for different combinations of the execution parameters and the experts, the set of priority data ranking hardware devices of the set of hardware devices for executing each expert of the mixture-of-experts system for each execution parameter of the plurality of execution parameters, wherein the plurality of execution parameters includes of execution speed, throughput, latency, and power consumption;

identify one execution parameter of the plurality of execution parameters to act as a basis for selecting a hardware device, of the set of hardware devices, on which to execute the expert, the expert being a component of a mixture-of-experts machine learning model;

retrieve, from the set of priority data stored in the data store, priority for a combination of the expert and the one execution parameter;

identify a hardware device of the set of hardware devices based on the priority data, the identifying including identifying a highest ranked hardware device, for the combination of the expert and the one execution parameter, that is available for processing the expert; and dispatch the expert to the identified hardware device for execution.

12. The system of claim 11, wherein executing the experts includes testing the plurality of execution parameters for the experts to obtain the set of priority data for the different combinations of the execution parameters and the experts.

13. The system of claim 12, wherein the testing comprises:

recording measurements from the executions of the experts for the plurality of execution parameters in the data store.

14. The system of claim 13, wherein the set of priority data is generated by:

comparing the recorded measurements.

15. The system of claim 11, wherein the set of hardware devices comprise one or more of a central processing unit, a graphics processing unit, a field programmable gate array, a dataflow execution unit, an application specific integrated circuit, and a microprocessor.

* * * * *